United States Patent
Gandhi et al.

(10) Patent No.: US 8,244,246 B2
(45) Date of Patent: Aug. 14, 2012

(54) BETTER SYSTEM RESELECTION IN MULTI-SYSTEM WIRELESS COMMUNICATION ENVIRONMENT

(75) Inventors: Manasi D. Gandhi, San Diego, CA (US); Shivank Nayak, Hyderabad (IN); Parag Mohan Kanade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 12/572,904

(22) Filed: Oct. 2, 2009

(65) Prior Publication Data
US 2010/0093349 A1    Apr. 15, 2010

Related U.S. Application Data

(60) Provisional application No. 61/104,819, filed on Oct. 13, 2008.

(51) Int. Cl.
*G06F 15/16* (2006.01)
(52) U.S. Cl. .................. 455/435.2; 455/432.1
(58) Field of Classification Search ............... 455/422.1, 455/432.1, 434, 435.2
See application file for complete search history.

(56) References Cited

U.S. PATENT DOCUMENTS

| | | |
|---|---|---|
| 7,194,264 B2 | 3/2007 | Li et al. |
| 2005/0085228 A1 | 4/2005 | Welnick et al. |
| 2008/0182615 A1 | 7/2008 | Xue et al. |

OTHER PUBLICATIONS

International Search Report and Written Opinion—PCT/US2009/060546—International Search Authority—European Patent Office, May 17, 2010.

*Primary Examiner* — Sam Bhattacharya
(74) *Attorney, Agent, or Firm* — Darren M Simon

(57) ABSTRACT

Disclosed are systems, methods and computer program products for better system reselection (BSR) in a multi-system wireless communication environment. In one aspect, the BSR procedure provisions a mobile device to determine if a currently-registered wireless communication system is the most-preferred system among systems of a similar technology and among systems of different technologies identified in the device's combined preferred roaming list (PRL). The mobile device then activates an intra-system BSR timer if the currently-registered system is not the most-preferred system among systems of similar technology and an inter-system BSR timer if the currently-registered system is not the most-preferred system among systems of different technologies. Upon expiration of the intra-system BSR timer, the mobile device searches for a more-preferred system among systems of similar technology. Upon expiration of the inter-system BSR timer, the mobile device searches for a more-preferred system among systems of different technologies.

26 Claims, 7 Drawing Sheets

200

210

|   | Mode | Band | Channels |
|---|---|---|---|
| 1 | CDMA | 900MHz PCS | 430, 515 |
| 2 | HDR | 1800MHz | 340 |
| 3 | WCDMA/GSM | 750MHz, 2100Mhz, 1900MHz | |
| 4 | GSM/WCDMA | 800Mhz | |
| 5 | 1x | 900MHz PCS | 210, 650 |

220

| System type | SID-NID/PLMNid | Acquisition Index |
|---|---|---|
| 1X | 15550-65535 | 1 |
| WCDMA | 310-11 | 3 |
| HDR | 16660-65535 | 2 |
| GSM | 310-23 | 3 |
| GSM/WCDMA | 310-12 | 4 |
| 1X | 15540-65535 | 5 |

FIG. 2

BETTER SYSTEM RESELECTION IN MULTI-SYSTEM WIRELESS COMMUNICATION ENVIRONMENT

CLAIM OF PRIORITY UNDER 35 U.S.C. §119

The present application for patent claims priority to Provisional Application No. 61/104,819 entitled "System Reselection Periodicity and Duration" filed Oct. 13, 2008, and assigned to the assignee hereof and hereby expressly incorporated by reference herein.

BACKGROUND

1. Field

This disclosure relates generally to the field of wireless communication systems and more specifically to the systems and methods for a better system reselection in a multi-system wireless communication environment.

2. Background

Wireless communication systems are widely deployed to provide various types of communication content such as voice, data, multimedia and other. Examples of such communication systems include Code Division Multiple Access (CDMA) systems, Wideband CDMA, Global System for Mobile communications (GSM), Universal Mobile Telecommunication System (UMTS), 3rd Generation Partnership Project (3GPP) Long Term Evolution (LTE) systems, and other types of wireless communication systems. These wireless communication systems generally use different radio access technologies and communication protocols, operate at different frequency bands, provide different quality of service (QoS) and offer different types of services and applications to the system users.

Due to the differences between these systems, popularity of multimode mobile devices that are capable of operating on multiple heterogeneous wireless communication systems has grown. Multimode mobile devices are generally programmed to search for all available communication systems and connect to the most-preferred one, as specified by the operator or user preference. However, if a mobile device is acquired on a less-preferred network, the device may remain on that network for a long time. Better system reselection procedures address this problem. Generally, the system operators provision mobile devices with a list of systems ordered by preference. The mobile device can use this information to reselect to the most-preferred available system, while remaining camped on the currently acquired system.

However, known system reselection techniques have limitations. For example, if the reselection period is too large, the mobile device would spend a longer time camped on the current less-preferred system. This could be detrimental to operator requirements. On the other hand, if reselection is done too often, the device will use a significant amount of time and power in scanning for other systems, which would adversely affect the battery life. Duration of the scan may also cause problems. During reselection scan, the mobile device's radio is tuned to frequencies other than the current channel. This means the device spends time not monitoring the paging channel on the current system, which may result in missed pages. Thus, having a long scan provides a disadvantage. In contrast, if the duration is too small, and if the reselection scan list is long enough to not fit in a single reselection instance, the device may never find the better system located at the end of the scan list.

SUMMARY

To address these and other limitations of prior art systems, disclosed herein are various example methodologies for better system reselection in a multi-system wireless communication environment that includes multiple independent wireless communication systems of similar and different technologies. In accordance with one aspect, a better system reselection procedure may be implemented in a multimode mobile device to determine whether the currently-acquired wireless communication system is the most-preferred, and if not, provide a mechanism to aid the mobile device in selecting a more-preferred system.

In accordance with one aspect, a better system reselection (BSR) procedure comprises generating a combined preferred roaming list (PRL) identifying relative preferences of wireless communication systems supported by the multimode mobile device and determining if the currently-acquired system is the most-preferred system among one or more second wireless communication systems of a similar technology and among one or more third wireless communication systems of different technologies. The procedure further includes activating an intra-system BSR timer if the currently-acquired system is not the most-preferred system among the one or more second wireless communication systems and activating an inter-system BSR timer if the currently-acquired system is not the most-preferred system among the one or more third wireless communication systems.

In accordance with another aspect, the BSR procedure further comprises searching for a more-preferred system among the one or more second wireless communication systems upon expiration of the intra-system BSR timer and searching for a more-preferred system among the one or more third wireless communication systems upon expiration of the inter-system BSR timer. Upon acquisition by the mobile device of a more-preferred system, registering the mobile device with the more-preferred system. In one aspect, the better system reselection procedure may be executed in a periodic manner in order to increase the probability of successful acquisition in fading scenarios. In another aspect, the duration of the reselection procedure may be limited in order to save the battery life of the mobile device.

The above simplified summary of one or more aspects serves to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2 is an illustration of one aspect of a combined preferred roaming list.

DETAILED DESCRIPTION

Figure 1:
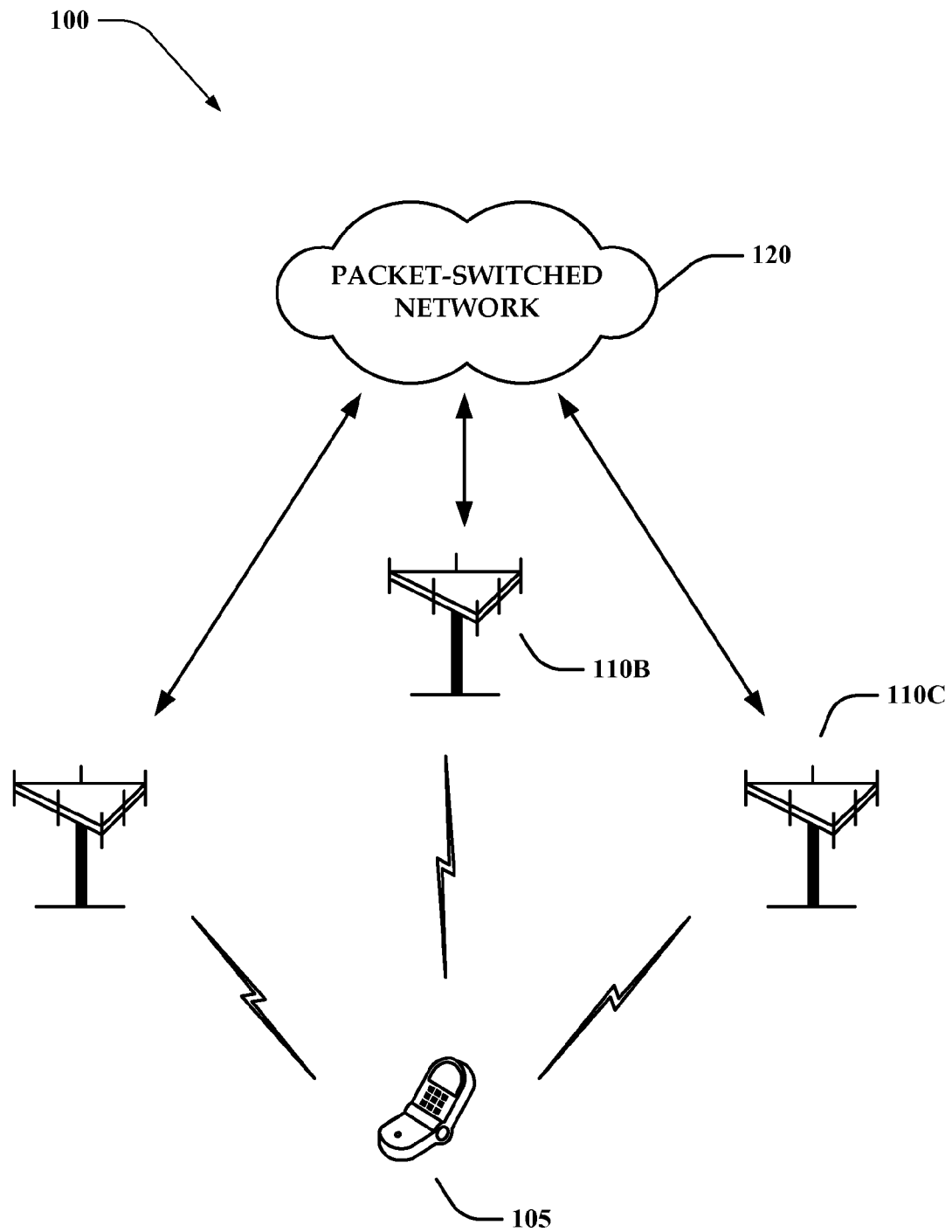
FIG. 1 is an illustration of a wireless communication environment in accordance with various aspects.

Various aspects of methodologies for better system reselection in a wireless communication environment are now described with reference to the drawings. In the following description, for purposes of explanation, numerous specific details are set forth in order to provide a thorough understanding of one or more aspects. It may be evident, however, that such aspect(s) may be practiced without these specific details.

As used in this disclosure, the terms "component," "module," "system" and the like are intended to include a computer-related entity, such as but not limited to hardware, firmware, a combination of hardware and software, software, or software in execution. For example, a component may be, but is not limited to being, a process running on a processor, object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet or other types of packet-switched networks with other systems by way of the signal.

Moreover, various aspects or features of methodologies for better system reselection described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Various aspects or features of methodologies for better system reselection in a wireless communication environment will be presented in terms of systems that may include a number of mobile devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates one aspect of a wireless communication environment 100 that includes one or more multimode mobile devices 105 and a plurality of wireless communication systems 110. Mobile device 105 can be a cellular telephone, a cordless telephone, a Session Initiation Protocol (SIP) phone, a personal digital assistant (PDA), a handheld device having wireless connection capability, a laptop computer, or other processing device connected to a wireless modem. Mobile device 105 may also be called a subscriber unit, subscriber station, mobile station, mobile, remote station, remote terminal, access terminal, user terminal, terminal, wireless communication device, user agent, user device, or user equipment (UE). Wireless communication systems 110 provide mobile devices 105 with radio access to a wired core network, such as a packet-switched network 120 (e.g., Internet) or a circuit-switched network (e.g., public switched telephone network). A system 110 may generally include one or more radio base stations having multiple antenna groups and/or a transmitter/receiver chain that can in turn comprise a plurality of components associated with radio signal transmission and reception (e.g., processors, modulators, multiplexers, antennas, etc. (not shown)) to and from mobile devices 105.

Wireless communication systems 110 may include, but are not limited to, CDMA, TDMA, FDMA, OFDMA, SC-FDMA and other systems. The terms "system" and "network" are used interchangeably herein. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

In one aspect, a multimode mobile device 105 may access multiple independent wireless communication systems 110, i.e., systems having different technologies that don't have a common standard/specification specifying better system reselection (BSR) procedure from one technology to other. For example, 1×CDMA2000 and High Data Rate (HDR) systems have common specifications that specify reselection procedure from one technology to other. In particular, in a 1×/HDR system, mobile device 105 performs periodic reselection on preferred systems specified in the preferred roaming lists (PRL) of the device per the timer specified in the device's non-volatile memory. Also, after end of a call, mobile device 105 performs periodic reselection for better system based on another timer parameter. Likewise, UMTS systems, such as GSM and WCDMA, have common specifications, in which mobile device is required to perform a first periodic search attempt for more preferred UMTS networks after two minutes of registration, and every T minutes thereafter, where T is specified in the subscriber identity module (SIM) of the mobile device. However, currently there is no common BSR procedure between 1×/HDR systems and UMTS (GSM/WDMA).

For multimode mobile devices 105 that support independent wireless communication system, such as UMTS and 1×/HDR, apart from searching for preferred systems in the technology currently registered on, there is a need to perform better system reselection to preferred system's of other supported technology as per the relative preference of system between these two technologies. To that end, in one aspect, the mobile device 105 may be configured to generate a combined preferred roaming list (PRL) which identifies relative preferences among various wireless communication systems 110A, 110B and 100C having different technologies. In another aspect, mobile device 105 may be programmed with the combined PRL via a serial interface, a Universal Serial Bus (USB) interface during manufacturing or activation. In yet another aspect, wireless device 105 may obtain the combined PRL via over-the-air signaling during device activation, or it may be stored in a RUIM/CSIM/UIM module by the operator and distributed to users in the form of RUIM/CSIM cards. In any case, mobile device 105 may stores the combined PRL in a non-volatile memory, so that the PRL is retained even when power is turned off. Some example methodologies for generating a combined PRL are described in a commonly owned U.S. Pat. No. 7,194,264 issued Mar. 20, 2007, which is incorporated by reference herein in its entirety.

FIG. 2 depicts an example combined PRL that includes 3GPP family of systems and 3GPP2 family of systems. As depicted, combined PRL 200 may include a system table 210 and an acquisition table 220. PRL 200 may be organized by geographic areas (GEOs), so that different GEOs may have different system tables 210 and acquisition tables 220. System table 210 may include a list of permitted (and forbidden) systems/networks for a given GEO, such as CDMA, HDR WCDMA/GSM etc., and their relative preferences with respect to each other. Thus, according to the PRL 200, a CDMA system has a higher preference than a HDR system, which has a higher preference than WCDMA/GSM systems and so on. Acquisition table 220 may include an acquisition record for each system listed in the system table 210. Each acquisition record includes parameters used for system acquisition, such as SID-NID, PLMNid and other parameters known to those of skill in the art. The format of the combined PRL may depend on system specifications, operator requirements or other factors.

To further facilitate better system reselection, the BSR procedure may provide for one or more configurable timers that periodically trigger the system scan. In one aspect, an intra-system BSR timer may be used to control better system reselection among wireless communication systems 110 of a similar technology as the currently-acquired system. The value of the intra-system BSR timer may be specified in the standard specification for the given technology, such as 180 to 600 seconds provided by the 1× standard. In another aspect, an inter-system BSR timer may be used to control better system reselection among wireless communication systems 110 having technologies different from the currently-acquired system. The value of the inter-system BSR timer may be selected by the system operator to optimize the duration of the reselection period so that it is not too long and the mobile device 105 does not spend a longer time camped on the current less-preferred system, nor that it is too short and the mobile device 105 does not use significant amount of time and power in scanning for other systems 110, which would adversely affect the battery life of the mobile device. In one aspect, the value of the inter-system BSR timer may be longer than duration of the system reselection scans and, for example, may be set to three minutes.

Figure 3:
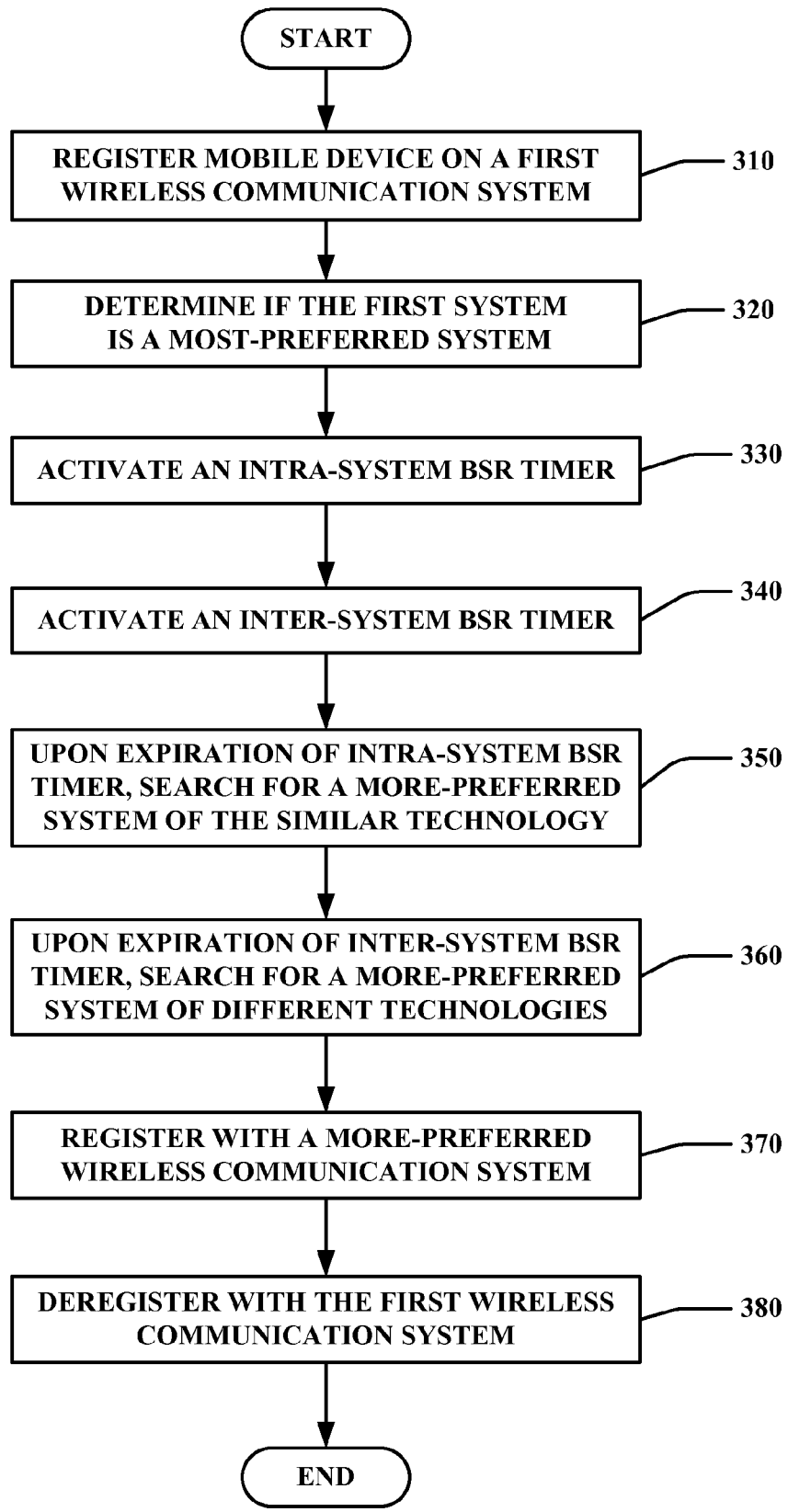
FIG. 3 is an illustration of an example methodology for better system reselection.

FIG. 3 depicts one aspect of the methodology for a better system reselection using these timers. At step 310, mobile device 105 registers on a wireless communication system 110A. At step 320, mobile device 105 determines if wireless communication system 110A is a most-preferred system among one or more wireless communication systems 110B of a similar technology and among one or more wireless communication systems 110C of different technologies. For example, the mobile device 105 may access its combined PRL to determine if there are more-preferred systems than the currently-acquired system 110A. If system 110A is not the most-preferred system among the wireless communication systems 110B of the similar technology, mobile device 110 activates an intra-system BSR timer at step 330. If system 110A is not the most-preferred system among the wireless communication systems 110C of different technologies, mobile device 110 activates an inter-system BSR timer at step 340. Upon expiration of the intra-system BSR timer, at step 350, mobile device 105 may search for a more-preferred system among the wireless communication systems 110B of the similar technology identified in the device's combined PRL. Upon expiration of the inter-system BSR timer, at step 360, mobile device 105 may search for a more-preferred system among wireless communication systems 110C of different technologies identified in the combined PRL. If a more-preferred system is detected among systems 110B or systems 110C, mobile device 105 may register with the more-preferred system at step 370 and deregister with wireless communication system 110A at step 380.

A system-specific example of the methodology of FIG. 3 is provided next with reference to the combined PRL in FIG. 2. For example, mobile device 105 successfully registers on 310-12 GSM network, on which it is roaming. The mobile device then activates the intra-system BSR timer (i.e., periodic HPLMN timer as per 3GPP protocol) for 2 minutes. The device will also check if there are systems of other technologies that also need to be searched. If there are more preferred system of other technologies (which is the case here), the mobile device will also start an inter-system BSR timer for, e.g., 3 minutes, for better system reselection between different technologies. Upon intra-system BSR timer expiry, mobile device 105 will perform a search for better PLMN as per 3GPP specification, and thus will try to search for 310-11 WCDMA and 310-23 GSM. Upon inter-system BSR timer expiry, mobile device 105 will search systems of different technologies, such as 1× 900 MHz PCS chan 430, 515 and HDR 1800 MHz chan 340, and will attempt to acquire those systems.

In one aspect, in order to further optimize system reselection scans, the better system reselection procedure may require the mobile device 105 to perform power measurement over all RF channels of the more-preferred wireless communication systems 110 identified from the combined PRL. The results of such a measurement would indicate which channels of the more-preferred system have a strong energy when compared to an established threshold for example −70 dBm for UMTS systems. This threshold could be predetermined or based on dynamic parameters like RF conditions. Channel acquisition can then be attempted only on those systems that meet the threshold criterion. As should be appreciated by those of ordinary skill in the art, this would considerably reduce time spent in acquisition on more-preferred systems identified in the combined PRL that are currently not in the mobile device's coverage area.

In another aspect, periodicity of the BSR procedure may be controlled using a non-static value of the inter-system BSR timer. In one aspect, the duration of the inter-system BSR timer may depend on the configuration requirements of the currently-registered wireless communication system. In another aspect, it may depend on the status of the currently-registered wireless communication system. For example, if only limited, e.g., emergency only, service available on currently-acquired system, then a shorter duration inter-system BSR timer, e.g., 20 seconds, may be used. Yet in another aspect, the duration of the inter-system BSR timer may depend on the relative preference of the more-preferred wireless communication systems over the currently-registered wireless communication system. For example, if the mobile device is idle on a low priority system and there are some higher priority systems of other technology, along with some systems of same technology which are even higher preferred to systems of other technology. In this case, a long duration-inter-system BSR timer, e.g., 10 minutes, may be activated. Yet in further aspect, the inter-system BSR timer may depend on the timing of the activation of the timer relative to the use of the mobile device. For example, at the end of a call, a short duration inter-system BSR timer, e.g., 10 seconds, may be used instead of a long timer. In another embodiment, the duration of the inter-system BSR timer may depend on the number of prior failed attempts to acquire a more-preferred system. For example, by using a shorter inter-system BSR timer, periodicity of reselection scans can be high right after the initial less-preferred system acquisition and then may be gradually decreased by increasing the duration of the inter-system BSR timer after every unsuccessful more-preferred system reselection attempt.

Yet in one aspect, duration of the inter-system reselection scans can also be controlled. For example, duration of the reselection scan can be fixed on systems having technology similar to the most-preferred system if no channel has been acquired on the most preferred system yet. In another example, in case some failure happened during registration on a more-preferred system, the reselection scan can be immediately terminated and the mobile device can revert to the old system so as to provide full service immediately. Yet in another example, in case of user intervention (such as initiating a call etc.) during system reselection scan, the scan can be immediately terminated and the mobile device reverts to the currently-registered system to handle the call request. In another example, if some mandatory procedure (like periodic location update) needs to be performed on the currently-registered system, then the inter-system reselection scan can be suspended or postponed for the duration of the mandatory procedure and then restarted. In order to restart the reselection scan from the point where it was stopped, the mobile device may store an identifier for the last scanned system and continue the inter-system reselection scan from that point on. Yet in another example, inter-system reselection scan can be done progressively so that every time the inter-system BSR timer expires, reselection scan would be started from the position it left off in the previous reselection period. This ensures that all systems and channels in the combined PRL are covered, irrespective of the length of the list.

Figure 4:
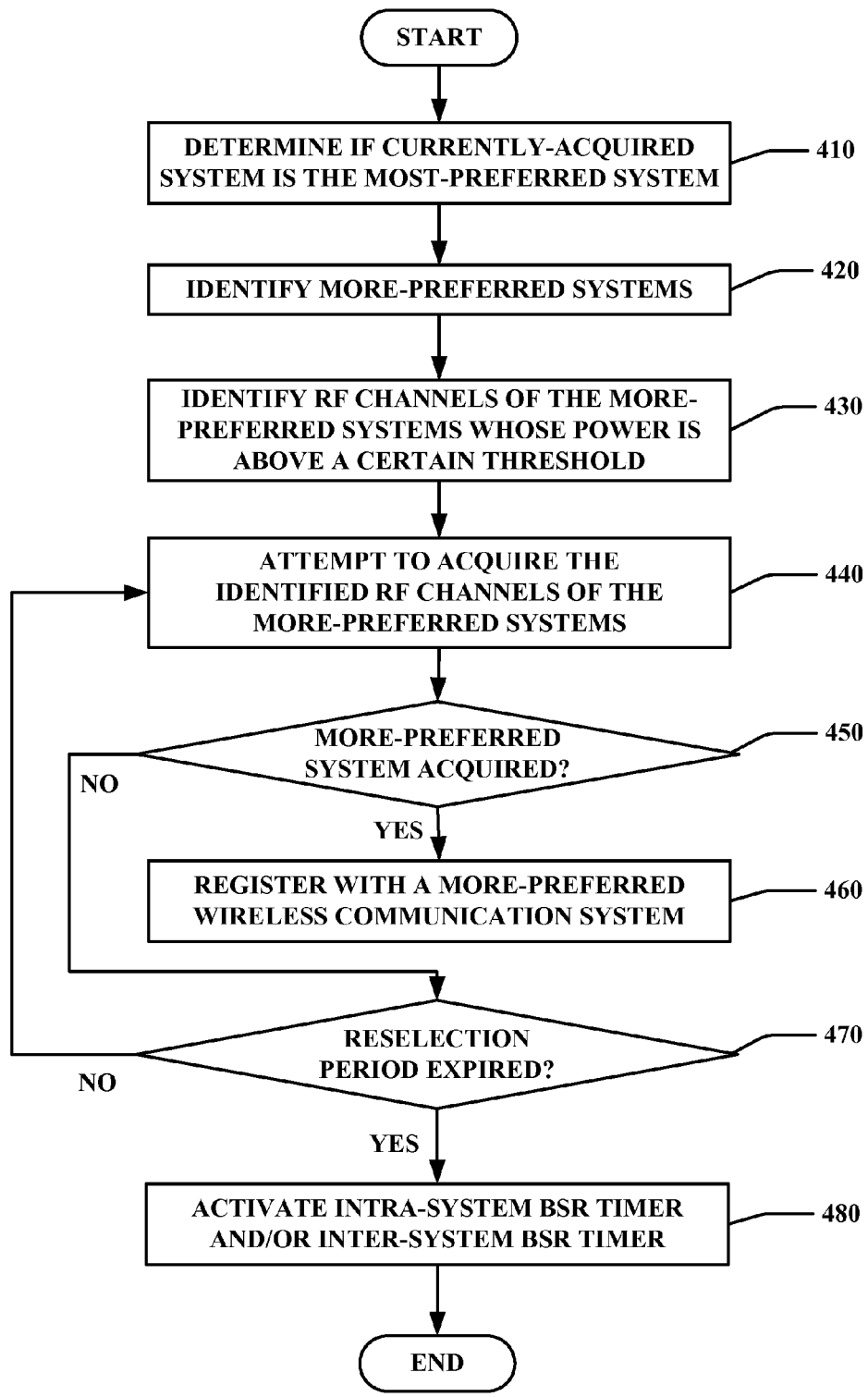
FIG. 4 is an illustration of another example methodology for better system reselection.

FIG. 4 illustrates another aspect of the methodology for a better system reselection. At step 410, mobile device 105 registers on a wireless communication system 110A and checks on the combined PRL if there are more-preferred systems among system 110B of similar technology or systems 110C of different technology. At step 420, mobile device 105 determines that system 110A is not the most-preferred system. At step 430, mobile device 105 scans and measures power on RF channels of the more-preferred systems 110B and 110C, to identify channels whose power is above a certain threshold. At step 440, mobile device 105 attempts to acquire the identified RF channels of the more-preferred systems. If a more preferred system is acquired at step 450, mobile device 105 may register with that system at step 460 and deregisters with the old system. If at step 470 a more preferred system is not acquired within a predefined reselection period, e.g., 10 seconds, the reselection scan may be terminated, the mobile device records the last system scanned, so it can continue scanning from that point on in the next reselection scan cycle, and activates the intra-system BSR timer and/or inter system BSR timer at step 480. If the reselection period has not expired at step 470, mobile device 105 may continue searching for a more-preferred system.

Figure 5:
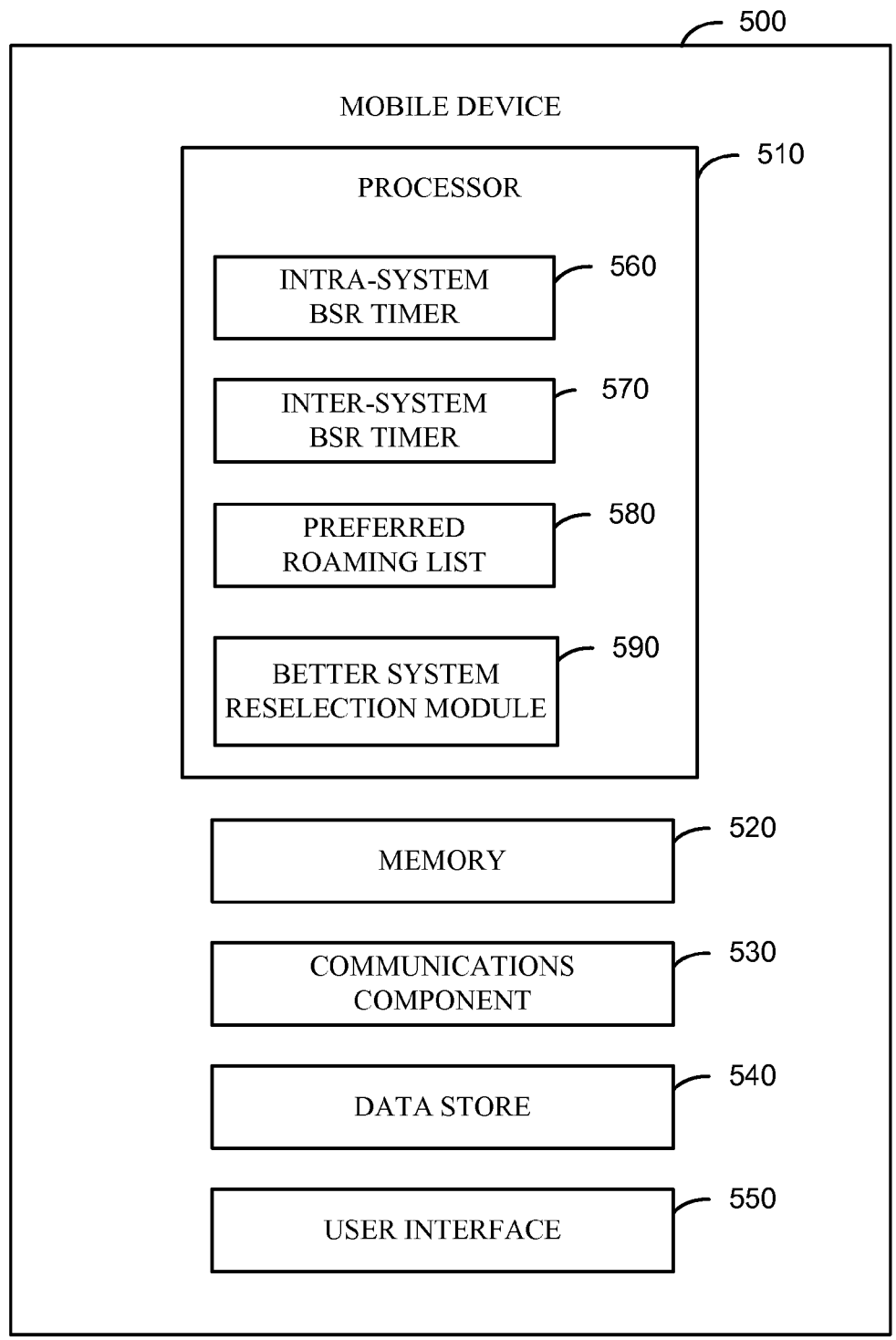
FIG. 5 is an illustration an example multimode mobile device utilizing a better system reselection procedure.

FIG. 5 illustrates an example multimode mobile device 500 operable to perform better system reselection in accordance with methodologies disclosed herein. Mobile device 500 includes a processor 510 for carrying out processing functions associated with better system reselection and acquisition in accordance with the methodologies disclosed herein as well as other functions. Processor 510 can include a single or multiple set of processors or multi-core processors. In one example aspect, processor 510 may store in one of its registers an intra-system BSR timer 560 used to control time between successive intra-system reselection scans among wireless communication systems having technology similar to the currently-registered system. Processor 510 may also store in one of its registers an inter-system BSR timer 570 used to control time between successive inter-system reselection scans among wireless communication systems of different technologies. Processor 510 may also generate a combined preferred roaming list 580 based on individual PRLs for various independent wireless communication systems. Processor 510 may also include a better system reselection and acquisition module 590 that implements a BSR procedures disclosed herein.

Mobile device 500 further includes a memory 520 coupled to processor 510, such as for storing local versions of applications being executed by processor 510 as well as better system reselection procedures and data associated therewith. Memory 520 can include any type of memory usable by a computer, such as random access memory (RAM), read only memory (ROM), magnetic discs, optical discs, volatile memory, non-volatile memory, and any combination thereof. Additionally, mobile device 500 may further include a data store 540 coupled to processor 510, which can be any suitable combination of hardware and/or software, that provides for mass storage of information, databases, and programs employed in connection with aspects described herein. For example, data store 540 may be a data repository for applications not currently being executed by processor 510 as well as files containing better system reselection procedures and data associated therewith.

Further, mobile device 500 includes a communications component 530 coupled to processor 510 for searching, establishing and maintaining communications with one or more wireless communication systems utilizing hardware, software, and services as described herein. For example, communications component 530 may include transmit chain components and receive chain components associated with a transmitter and receiver, respectively, operable for interfacing with wireless communication systems and devices of various radio access technologies and protocols. Processor 510 may further include a data transmission module for instructing communications component 530 to transmit/receive data to/from one or more wireless communication systems.

Mobile device 500 may include a user interface component 550 coupled to processor 550 and being operable to receive inputs from a user of mobile device 550 and further operable to generate outputs for presentation to the user. Component 550 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, component 550 may include one or more output devices, including but not limited to a display, a speaker, a haptic feedback mechanism, a printer, any other mechanism capable of presenting an output to a user, or any combination thereof.

Figure 6:
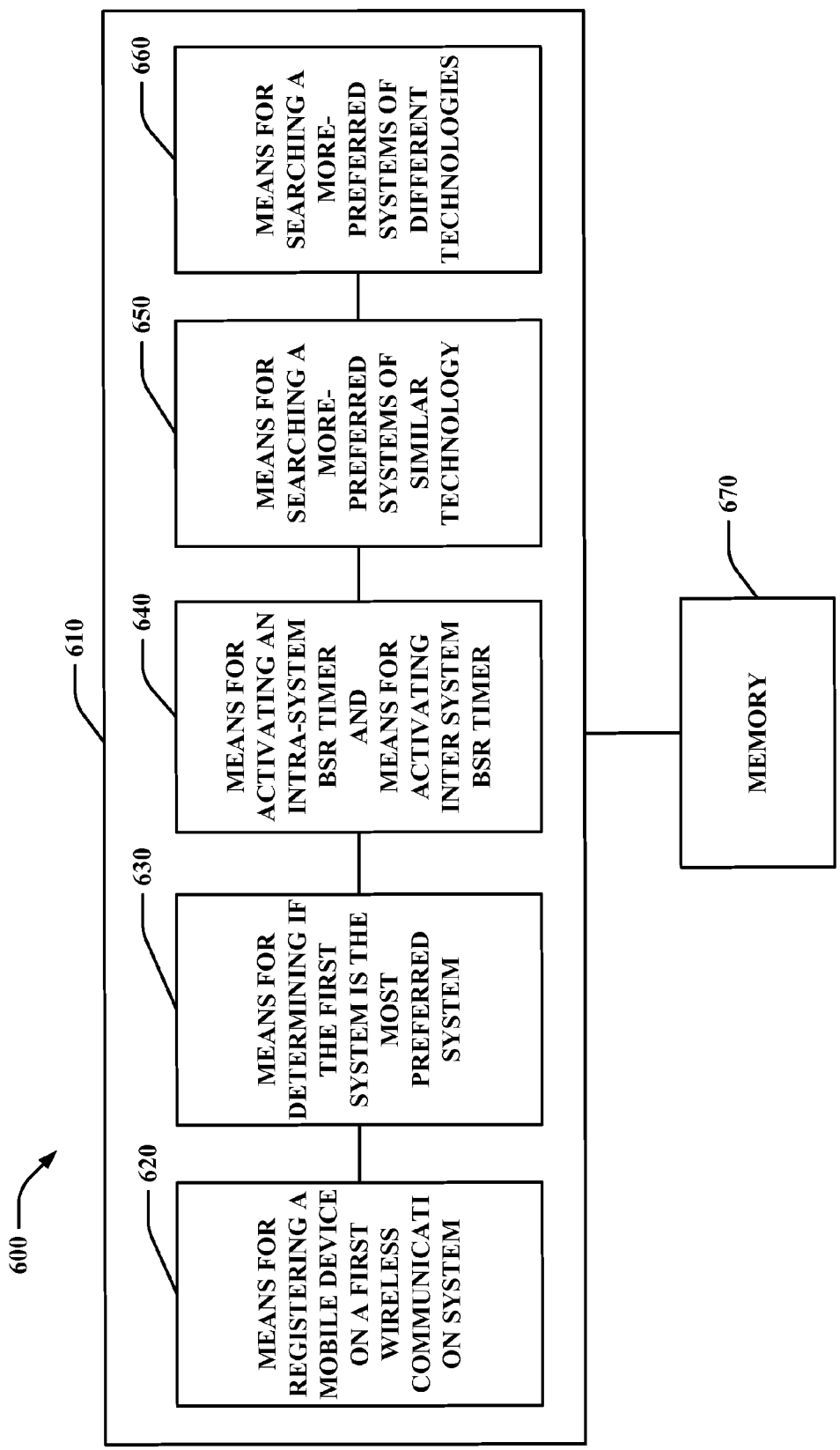
FIG. 6 is an illustration of an example system utilizing a better system reselection procedure.

Turning to FIG. 6, illustrated is a system 600 that may be implemented in a multimode mobile device. As depicted, system 600 includes functional blocks that can represent functions implemented by a processor, software, or combination thereof (e.g., firmware). System 600 includes a logical grouping 610 of electrical components that facilitate execution of better system reselection methodologies disclosed herein. Logical grouping 610 can include means 620 for registering a mobile device with a first wireless communication system. Further, logical grouping 610 includes means 630 for determining if the first wireless communication system is a most-preferred system among one or more second wireless communication systems of a similar technology and among one or more third wireless communication systems of different technologies. In addition, logical grouping 610 includes means 640 for activating an intra-system BSR timer if the first wireless communication system is not the most-preferred system among the one or more second wireless communication systems and for activating an inter-system BSR timer if the first wireless communication system is not the most-preferred system among the one or more third wireless communication systems. Further, logical grouping 610 includes means 650 for searching for a more-preferred system among the one or more second wireless communication systems upon expiration of the intra-system BSR timer. Lastly, logical grouping 610 includes means 660 for searching for a more-preferred system among the one or more third wireless communication systems upon expiration of the inter-system BSR timer. System 600 also includes a memory 760 that retains instructions for executing functions associated with electrical components 620-660. While shown as being external to memory 670, it is to be understood that electrical components 620-660 can exist within memory 670 of the multimode mobile device.

Figure 7:
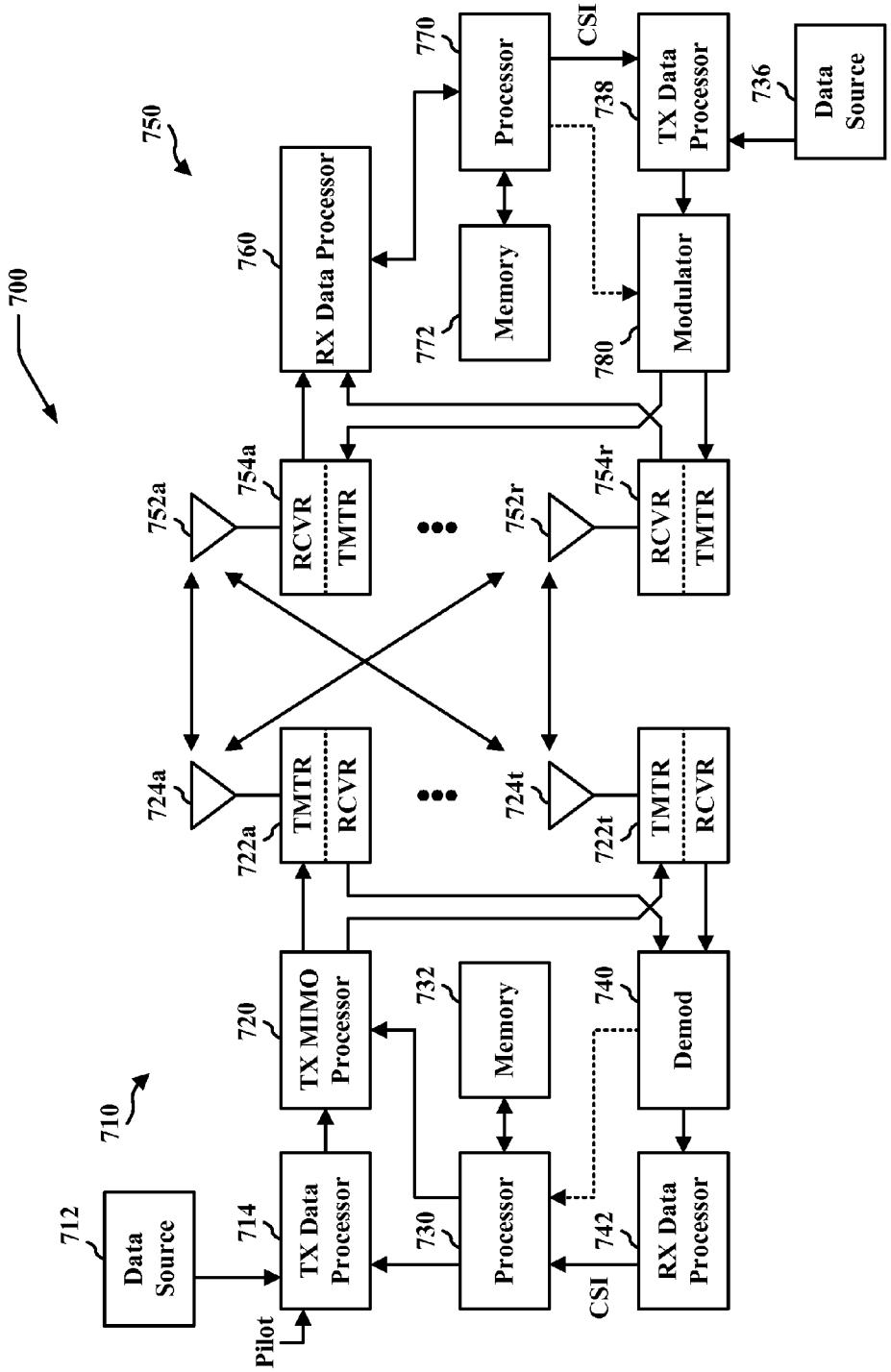
FIG. 7 is an illustration of an example wireless communication system utilizing a better system reselection procedure.

FIG. 7 shows an example of a wireless communication system 700 in which various aspects of the best system reselection procedures may be implemented. The system 700 depicts one base station/forward link transmitter 710 in a radio access network and one mobile device 750 for sake of brevity. However, it is to be appreciated that system 700 can include more than one base station/forward link transmitter and/or more than one mobile device, wherein additional base stations/transmitters and/or mobile devices can be substantially similar or different from example base station/forward link transmitters 710 and mobile device 750 described below. In addition, it is to be appreciated that base station/forward link transmitter 710 and/or mobile device 750 can employ the systems (FIGS. 1, 2, 5 and 6) and/or methods (FIGS. 3 and 4) described herein to facilitate better system reselection procedures and wireless communication there between.

At base station/forward link transmitter 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides NT modulation symbol streams to NT transmitters (TMTR) 722a through 722t. In various aspects, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 722a through 722t are transmitted from NT antennas 724a through 724t, respectively.

At mobile device 750, the transmitted modulated signals are received by NR antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the NR received symbol streams from NR receivers 754 based on a particular receiver processing technique to provide NT "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station/forward link transmitter 710.

A processor 770 can periodically determine which precoding matrix to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station/forward link transmitter 710.

At base station/forward link transmitter 710, the modulated signals from mobile device 750 can be received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights. It is to be appreciated that in the case of a forward link transmitter 710, as opposed to a base station, these RX components may not be present since data is only broadcasted over the forward link.

Processors 730 and 770 can direct (e.g., control, coordinate, manage, etc.) operation at base station/forward link transmitter 710 and mobile device 750, respectively. Respective processors 730 and 770 can be associated with memory 732 and 772 that store program codes and data. Processors 730 and 770 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means known in the art.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for better system reselection (BSR), the method comprising:
registering a mobile device with a first wireless communication system;
determining if the first wireless communication system is a most-preferred system among one or more second wireless communication systems of a similar technology and among one or more third wireless communication systems of different technologies;
activating an intra-system BSR timer if the first wireless communication system is not the most-preferred system among the one or more second wireless communication systems;
activating an inter-system BSR timer if the first wireless communication system is not the most-preferred system among the one or more third wireless communication systems;
upon expiration of the intra-system BSR timer, searching for a more-preferred system among the one or more second wireless communication systems; and
upon expiration of the inter-system BSR timer, searching for a more-preferred system among the one or more third wireless communication systems;
wherein searching for a more-preferred wireless communication system is performed for a predetermined reselection period of time, and
wherein duration of the reselection period in which the mobile device searches for a more-preferred system varies based on the number of prior failed attempts to acquire a more-preferred system.

2. The method of claim 1, wherein determining if the first wireless communication system is the most-preferred system further includes
generating a combined preferred roaming list (PRL) identifying the first wireless communication system, the one or more second wireless communication systems, the one or more third wireless communication systems and relative preferences of each identified system.

3. The method of claim 2, wherein searching for a more-preferred wireless communication system further includes
measuring power of one or more radio frequency (RF) channels of at least one more-preferred wireless communication system identified in the combined PRL; and
attempting acquisition of at least one RF channel of the at least one more-preferred wireless communication system having RF channel power above a threshold.

4. The method of claim 3, wherein the reselection period being shorter than duration of the inter-system BSR timer.

5. The method of claim 4, wherein upon acquisition by the mobile device of a RF channel of a more-preferred system within the reselection period,
registering the mobile device with the more-preferred system; and
deregistering the mobile device with the first wireless communication system.

6. The method of claim 4, wherein upon failure by the mobile device to acquire at least one RF channel of a more-preferred system within the reselection period,
suspending searching for a more-preferred system;
identifying last-scanned wireless communication system on the combined PRL; and
activating at least one of the intra-system BSR timer and the inter-system BSR timer.

7. The method of claim 6, wherein upon expiration of at least one of the intra-system BSR timer and the inter-system BSR timer, continuing searching for a more-preferred system from the last-scanned wireless communication system on the combined PRL.

8. The method of claim 7 further comprising postponing searching for a more-preferred system to perform mandatory procedures of the first wireless communication system.

9. The method of claim 4, wherein duration of the reselection period in which the mobile device searches for a more-preferred system varies is further based on one or more of the configuration requirements of the first wireless communication system, the status of the first wireless communication system, and the relative preference of the more-preferred third wireless communication systems over the first wireless communication system.

10. The method of claim 4, wherein duration of the inter-system BSR timer varies based on one or more of the configuration requirements of the first wireless communication system, the status of the first wireless communication system, the relative preference of the more-preferred third wireless communication systems over the first wireless communication system, the timing of the activation of the inter-system BSR timer relative to the use of the mobile device, and the number of prior failed attempts to acquire a more-preferred system.

11. A wireless communication system, comprising:
a processor and a communications component coupled to the processor, the processor being configured to
register a mobile device with a first wireless communication system;
determine if the first wireless communication system is a most-preferred system among one or more second wireless communication systems of a similar technology and among one or more third wireless communication systems of different technologies;
activate an intra-system better system reselection (BSR) timer if the first wireless communication system is not the most-preferred system among the one or more second wireless communication systems;
activate an inter-system BSR timer if the first wireless communication system is not the most-preferred system among the one or more third wireless communication systems;
upon expiration of the intra-system BSR timer, instruct the communication component to search for a more-preferred system among the one or more second wireless communication systems; and
upon expiration of the inter-system BSR timer, instruct the communication component to search for a more-preferred system among the one or more third wireless communication systems;
wherein searching for a more-preferred wireless communication system is performed for a predetermined reselection period of time, and
wherein duration of the reselection period in which the mobile device searches for a more-preferred system varies based on the number of prior failed attempts to acquire a more-preferred system.

12. The system of claim 11, wherein to determine if the first wireless communication system is the most-preferred system, the processor is further configured to
generate a combined preferred roaming list (PRL) identifying the first wireless communication system, the one or more second wireless communication systems, the one or more third wireless communication systems and relative preferences of each identified system.

13. The system of claim 12, wherein to search for a more-preferred wireless communication system, the processor is further configured to instruct the communication component to
measure power of one or more radio frequency (RF) channels of at least one more-preferred wireless communication system identified in the combined PRL; and
attempt acquisition of at least one RF channel of the at least one more-preferred wireless communication system having RF channel power above a threshold.

14. The system of claim 13, wherein the reselection period being shorter than duration of the inter-system BSR timer.

15. The system of claim 14, wherein upon acquisition by the mobile device of a RF channel of a more-preferred system within the reselection period, the processor is further configured to
register the mobile device with the more-preferred system; and
deregister the mobile device with the first wireless communication system.

16. The system of claim 14, wherein upon failure by the mobile device to acquire at least one RF channel of a more-preferred system within the reselection period, the processor is further configured to
suspend search for a more-preferred system;
identify last-scanned wireless communication system on the combined PRL; and
activate at least one of the intra-system BSR timer and the inter-system BSR timer.

17. The system of claim 16, wherein upon expiration of at least one of the intra-system BSR timer and the inter-system BSR timer, the processor is further configured to continue search for a more-preferred system from the last-scanned wireless communication system on the combined PRL.

18. The system of claim 17, wherein the processor being further configured to postpone search for a more-preferred system to perform mandatory procedures of the first wireless communication system.

19. The system of claim 18, wherein duration of the reselection period in which the mobile device searches for a more-preferred system varies is further based on one or more of the configuration requirements of the first wireless communication system, the status of the first wireless communication system, and the relative preference of the more-preferred third wireless communication systems over the first wireless communication system.

20. The system of claim 18, wherein duration of the inter-system BSR timer varies based on one or more of the configuration requirements of the first wireless communication system, the status of the first wireless communication system, the relative preference of the more-preferred third wireless communication systems over the first wireless communication system, the timing of the activation of the inter-system BSR timer relative to the use of the mobile device, and the number of prior failed attempts to acquire a more-preferred system.

21. A computer program product for better system reselection (BSR), comprising:
a computer-readable medium comprising:
a first set of codes for causing a mobile device to register with a first wireless communication system;
a second set of codes for causing the mobile device to determine if the first wireless communication system is a most-preferred system among one or more second wireless communication systems of a similar technology and among one or more third wireless communication systems of different technologies;
a third set of codes for causing the mobile device to activate an intra-system BSR timer if the first wireless communication system is not the most-preferred system among the one or more second wireless communication systems;
a fourth set of codes for causing the mobile device to activate an inter-system BSR timer if the first wireless communication system is not the most-preferred system among the one or more third wireless communication systems;
a fifth set of codes for causing the mobile device to search for a more-preferred system among the one or more second wireless communication systems upon expiration of the intra-system BSR timer; and
a sixth set of codes for causing the mobile device searching for a more-preferred system among the one or more third wireless communication systems upon expiration of the inter-system BSR timer;
wherein searching for a more preferred wireless communication system is performed for a predetermined reselection period of time, and
wherein duration of the reselection period in which the mobile device searches for a more-preferred system varies based on the number of prior failed attempts to acquire a more-preferred system.

22. The computer-readable medium of claim 21, wherein the second set of codes further includes a seventh set of codes for generating a combined preferred roaming list (PRL) identifying the first wireless communication system, the one or more second wireless communication systems, the one or more third wireless communication systems and relative preferences of each identified system.

23. The computer-readable medium of claim 22, wherein the sixth set of codes further includes
an eighth set of codes for measuring power of one or more radio frequency (RF) channels of at least one more-preferred wireless communication system identified in the combined PRL; and
a ninth set of codes for attempting acquisition of at least one RF channel of the at least one more-preferred wireless communication system having RF channel power above a threshold.

24. An apparatus for better system reselection (BSR), comprising:
means for registering a mobile device with a first wireless communication system;
means for determining if the first wireless communication system is a most-preferred system among one or more second wireless communication systems of a similar technology and among one or more third wireless communication systems of different technologies;
means for activating an intra-system BSR timer if the first wireless communication system is not the most-preferred system among the one or more second wireless communication systems;
means for activating an inter-system BSR timer if the first wireless communication system is not the most-preferred system among the one or more third wireless communication systems;
means for searching for a more-preferred system among the one or more second wireless communication systems upon expiration of the intra-system BSR timer; and
means for searching for a more-preferred system among the one or more third wireless communication systems upon expiration of the inter-system BSR time;

wherein searching for a more-preferred wireless communication system is performed for a predetermined reselection period of time, and wherein duration of the reselection period in which the mobile device searches for a more-preferred system varies based on the number of prior failed attempts to acquire a more-preferred system.

25. The apparatus of claim 24, wherein means for determining if the first wireless communication system is the most-preferred system further include means for generating a combined preferred roaming list (PRL) identifying the first wireless communication system, the one or more second wireless communication systems, the one or more third wireless communication systems and relative preferences of each identified system.

26. The apparatus of claim 25, wherein means for searching for a more-preferred wireless communication system further includes means for measuring power of one or more radio frequency (RF) channels of at least one more-preferred wireless communication system identified in the combined PRL; and means for attempting acquisition of at least one RF channel of the at least one more-preferred wireless communication system having RF channel power above a threshold.

* * * * *